United States Patent [19]
Ono et al.

[11] 3,906,323
[45] Sept. 16, 1975

[54] INDUSTRIAL ROBOT

[75] Inventors: Takehiko Ono; Nobuo Taguchi, both of Fuchu, Japan

[73] Assignee: Tokyo Shibaura Electric Co., Ltd., Japan

[22] Filed: Jan. 25, 1974

[21] Appl. No.: 436,746

[30] Foreign Application Priority Data
Jan. 25, 1973  Japan.................................. 48-9884

[52] U.S. Cl. ................ 318/563; 318/565; 318/625; 318/632
[51] Int. Cl.²........................................... G05B 9/02
[58] Field of Search ............ 318/563, 565, 625, 632

[56] References Cited
UNITED STATES PATENTS

| | | | |
|---|---|---|---|
| 2,525,636 | 10/1950 | Bedford et al. | 318/625 |
| 3,265,946 | 8/1966 | Johnson et al. | 318/563 |
| 3,401,904 | 9/1968 | Nelson | 318/565 X |
| 3,462,661 | 8/1969 | Nelson | 318/563 |
| 3,509,435 | 4/1970 | Howells | 318/565 X |

Primary Examiner—B. Dobeck
Attorney, Agent, or Firm—Oblon, Fisher, Spivak, McClelland & Maier

[57] ABSTRACT

An industrial robot having a plurality of moving members mechanically interconnected such that operation of one member causes undesirable movement in another. Disclosed are novel electrical control means for compensating for such undesirable movement. The control means include an error signal generator and manipulation signal generator for each member which respond to the difference between the actual and desired movement thereof. The error signals developed for the undesired movement-producing members are fed to the manipulation signal generators of such members. Additionally, the output of a position detector for each member is compensated by a signal from the undesired-movement-producing members' position detector. The control means are interconnected in such a way so as to assure continuous and trouble-free operation in response to the desired position of each member as generated by its associated command device.

10 Claims, 7 Drawing Figures

INDUSTRIAL ROBOT

BACKGROUND OF THE INVENTION

1. Field of the Invention

This invention relates to an industrial robot and, more particularly to an industrial robot which utilizes an electronic circuit for the control thereof.

2. Description of the Prior Art

There exists many devices in the art known as industrial robots which can, in place of human hands, perform relatively complicated tasks. In such robot machines, it is necessary to control a plurality of moving members contained therein for performing designated work. From a mechanical point of view, simple construction of such a machine is, of course, preferable. But frequently the employment of simplified construction in the machine leads to a situation wherein the actuation of one moving member will cause another moving member to behave in an undesirable way. Thus, it becomes necessary in controlling such members to be able to compensate for this undesirable behavior or movement.

SUMMARY OF THE INVENTION

One object of the present invention is to provide an improved industrial robot having new and unique control means of simple construction which is capable of compensating for the undesirable movement of the moving members contained in the robot machine.

Another object of this invention is to provide an improved industrial robot having control means capable of accomplishing a smooth operation of the moving members.

The foregoing and other objects are attained in accordance with one aspect of the present invention through the provision of electrical control means for each of a plurality of moving members of an industrial robot, each of said control means being responsive to its associated member's actuator which includes means for generating an error signal indicative of the difference between the actual and desired positions of the member and means for generating a manipulating signal for controlling the movement of the member. The latter signal is generated in response to the error signal of the associated member and, in those control means whose members are subjected to undesirable movement, in response to the error signal belonging to the control means of the undesirable-movement-producing member. Additionally, each control means has a feedback loop including a position detector to develop a reference signal to be compared to the desired command signal for that member. In those control means whose members are subjected to undesirable movement, the reference signal is corrected by a comparator which compensates for such undesired movement by comparing the position signal of the undesirable movement-producing member with that of present member to develop a difference signal which is subsequently utilized to generate said error signal.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF THE PREFERRED EMBODIMENT

Figure 1:
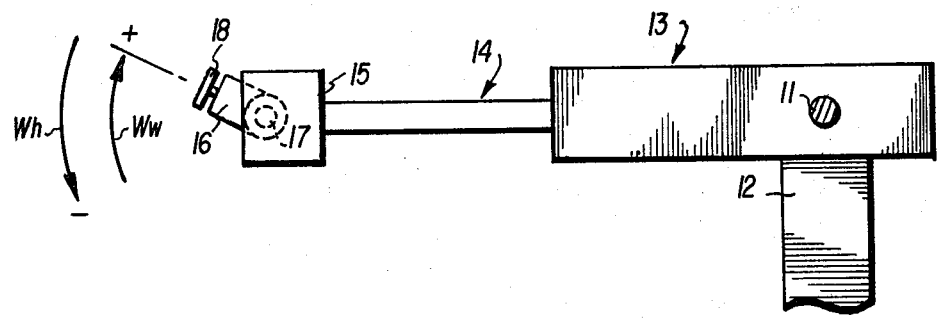
FIG. 1 is a schematic side view of one embodiment of the industrial robot machine according to the present invention.

Referring now to the drawings, wherein like reference numerals designate identical or corresponding parts throughout the several views, and more particularly to FIG. 1 thereof, which illustrates a side view of the robot machine according to one preferred embodiment of the present invention, wherein pivotally mounted about an axis 11 on a column member 12 is an arm base or turret portion 13 on which a retractable arm member 14 is provided. Rotatably mounted on the arm 14 about the lenghwise axis thereof is a hand base member 15 on which a wrist member 16 is pivotally provided about an axis 17 as shown. A finger base member 18 is rotatably provided on the wrist 16 about the longitudinal axis thereof. On the finger base 18 there are mounted suitable means for performing work such as, for example, a pair of electrodes utilized in a welding operation.

Figure 2:
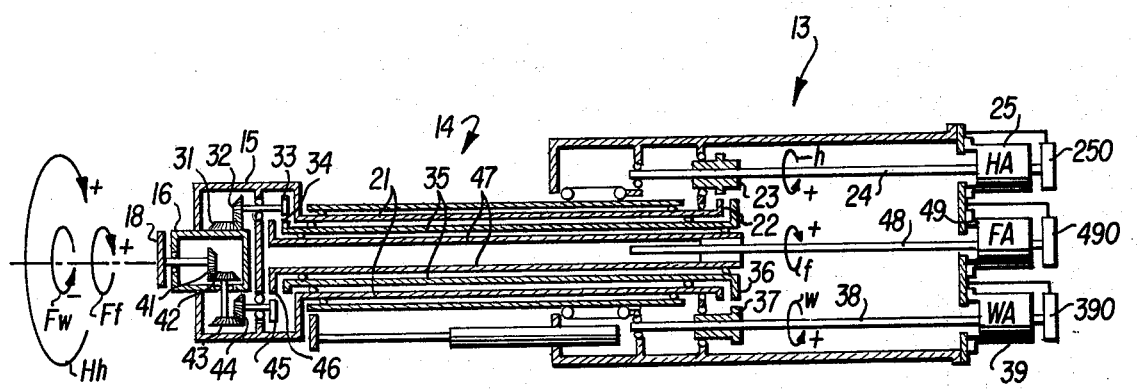
FIG. 2 is a plan view in cross-section of the embodiment shown in FIG. 1.

Referring now to FIG. 2, there is shown a cross-sectional plan view of the machine illustrated in FIG. 1, wherein the hand base 15 is actuated by an actuator 25 by means of a cylindrical shaft 21 secured to hand base 15, a gear 22 secured to the shaft 21 and a gear 23 slidably mounted lengthwise on a shaft 24 having a spline.

The wrist 16 is actuated by an actuator 39 by means of a gear 31 secured to the wrist 16, gears 32 and 33 which rotate in unison, a gear 34 secured to a cylindrical shaft 35 which is disposed co-axially within the shaft 21, a gear 36 secured to the right end of the shaft 35, and a gear 37 slidably mounted lengthwise on a shaft 38 having a spline.

The finger base 18 is actuated by an actuator 49 by means of a gear 41 fixedly connected through a shaft to a finger base 18, gears 42 and 43 which rotate in unison, gears 44 and 45 which rotate in unison, a gear 46 secured to a cylindrical shaft 47 disposed co-axially and inside the shaft 35, and a shaft 48 having a spline and slidably connected to the cylindrical shaft 47 lengthwise. The rotational position of actuators 25, 49 and 39 are respectively detected by position detectors 250, 490 and 390.

Operation of the machine depicted in FIGS. 1 and 2 will now be described. When the finger actuator 49 is operated in a right hand rotation (as viewed from the right of FIG. 2) as indicated by an arrow f while the hand and wrist actuators 25 and 39 remain stationary, the finger base 18 will be actuated to rotate in a right-hand rotation again as seen from the right as indicated by an arrow Ff. The hand base 15 and the wrist 16 are not influenced by the operation of the finger actuator 49, i.e. they do not move.

When the wrist actuator 39 is operated in a left-hand rotation as indicated by an arrow w, while the hand and finger actuators 25 and 49 are kept still, the wrist 16 will bend upwardly as indicated by an arrow W*w* (as shown in FIG. 1). Simultaneously, the finger base 18 will rotate in a left-hand rotation as indicated by an arrow F*w*, in FIG. 2, because the gear 41, contained in the wrist 16, is moved together with the wrist 16 while the gear 42 is stationarily connected through a gear train to the finger actuator 49. This movement of the finger base 18 is undesirable.

When the hand actuator 25 is operated in a left-hand rotation as indicated by an arrow h while the wrist and finger actuators 39 and 49 are not operated, the hand base 15 is actuated to rotate in a right-hand rotation as shown by an arrow H*h*. Simultaneously, the wrist 16 will bend downwardly as shown by an arrow W*h* of FIG. 1 because the gear 33, contained in the hand base 15 is moved together with the hand base 15 while the gear 34 is kept stationary. But the finger base 18 will not be rotated with respect to the turret 13, because the gear 45 is meshed with the gear 46 and is rotated in a manner similar to the rotation of the gear 33, hence the gears 43 and 42 rotate in unison with the gear 31 or the wrist 16. Thus, the aforedescribed actuation of the hand base 15 results only in an undesirable movement of the wrist 16.

For the sake of clarity and simplicity, several assumptions and sign conventions will be adopted hereinafter. First, a positive (+) or negative (−) sign will be given to the direction of rotation of each member. In the hand base 15, the wrist 16 and the finger base 18, a right-hand rotation will be referred to as being in a positive (+) direction, as indicated in FIG. 2 near each arrow-head, and vice versa. Then the sign of each actuator shaft rotation shall be as indicated in FIG. 2, and vice versa. The relations described above are summarized in the accompanying Table.

TABLE

| | To rotate the hand actuator (25) in a left-hand (+) Rotation.  | To rotate the finger actuator (49) in a right-hand (+) rotation.  | To rotate the wrist actuator (39) in a left-hand (+) Rotation.  |
|---|---|---|---|
| Movement of the Hand base (15) | Moved in a right-hand (+) rotation.  Proper movement | NOT MOVED | NOT MOVED |
| Movement of the Finger base (18) | NOT MOVED | Moved in a right-hand (+) rotation.  Proper movement | Moved in a left-hand (−) rotation.  Undesirable |
| Movement of the Wrist (16) | Bent downwardly (−).  Undesirable | NOT MOVED | Bent upwardly (+)  Proper movement |

It will also be assumed that when the hand actuator 25 is operated, the rotational angle of the hand base 15, whose movement is desired, and that of the wrist 16 whose accompanying movement is disadvantageous as described above, will be the same (but, of course, in the reverse direction). Also, when the wrist actuator 39 is operated, the rotational angle of the wrist 16, whose movement is desired, and that of the finger base, whose accompanying movement is disadvantageous as described above, will be assumed to be the same (but, of course, in the reverse direction).

The position detectors 250, 490 and 390 which are coupled respectively to the actuators 25, 49 and 39, as already described, develop output signals in a digital form which represent the angular position of the respective shafts 24, 48 and 38. These detectors 250, 490 and 390 are arranged such that the output signals thereof are expressed in a certain scale similar to the rotational angles of the hand base 15, the finger base 18 and the wrist 16, respectively.

In other words, when only the hand actuator 25 is operated in a positive or negative direction, the output of the detector 250 will increase or decrease by the same value as that by which the hand base 15 is rotated in the positive or negative direction, respectively. In this case, the output of the detector 250 represents the actual position of the hand base 15, because the hand base 15 will not move if the finger or wrist actuators 49 or 39 are operated. When only the finger actuator 49 is operated in a positive or negative direction, the output of the detector 490 will increase or decrease by the same value as that by which the finger base 18 is rotated in the positive or negative direction, respectively. In this case, the output of the detector 490 does not represent the position of the finger base 18 because the finger base 18 will move if the wrist actuator 39 is operated. When only the wrist actuator 39 is operated in a positive or negative direction, the output of the detector 390 will increase or decrease by the same value as that by which the wrist 16 is rotated in the positive or negative direction respectively. In this case, the output of detector 390 does not represent the position of the wrist 16 since the latter will be moved if the hand actuator 25 is operated.

It will be further assumed that the rated or highest rotational speeds of the hand base 15 with respect to the turret 13, the wrist 16 with respect to the hand base 15, and the finger base 18 with respect to the hand base 15 are respectively S° per second, such as, for example, 90°/sec. Then, it is necessary and sufficient for the hand actuator 25 that its rated speed be S (90) °/sec. when measured as the time derivative of the output of the detector 250, because the hand base 15 is free from undesirable movement caused by operation of the wrist actuator 39, as will be easily understood from the above TABLE.

It is necessary and sufficient for the wrist actuator 39 that it have a rated speed of 2S (e.g., 180) °/sec. when measured as the time derivative of the output of the detector 390, because the wrist 16 is also rotated at the speed of S °/sec. in a negative (or positive) direction if the hand actuator 25 is operated to rotate at S °/sec. in a positive (or negative) direction, respectively, and S °/sec. is necessary to offset this undesirable movement.

A rated speed of 3S (e.g., 270) °/sec. when measured as the time derivative of the output of the detector (490) is necessary and sufficient for the finger actuator 49, since when the wrist actuator 39 is operated at 2S (e.g., 180) °/sec. in a positive (or negative) direction, the finger base 18 is rotated in a negative (or positive) direction at 2S(e.g., 180) °/sec. and the additional 2S °/sec. is necessary for the finger actuator to offset this undesirable movement.

The speed defined by the time derivative of each output of the detectors 250, 490 and 390 will be referred to hereinafter as the "speed of the actuator".

Figure 3:
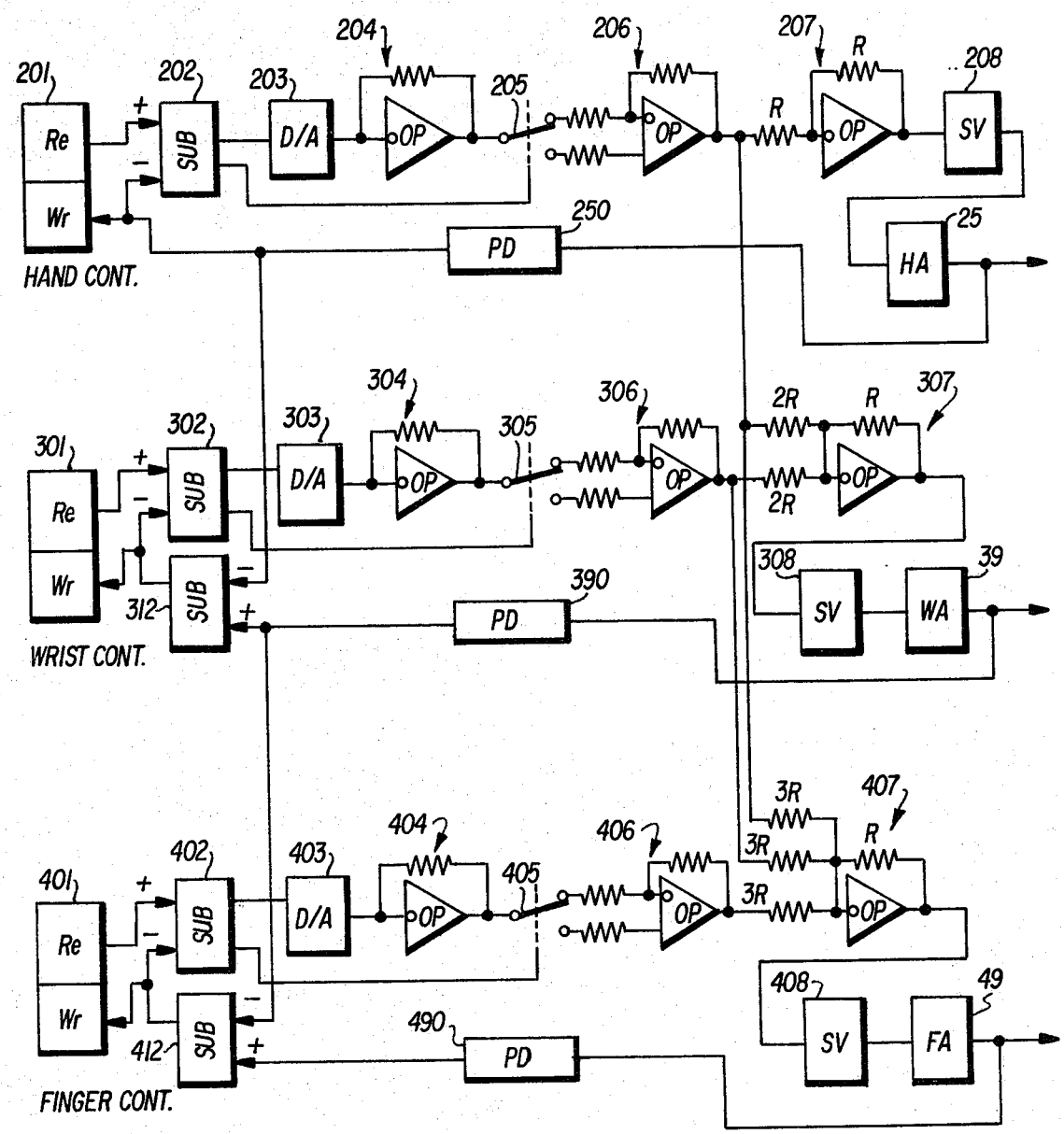
FIG. 3 is a block diagram of a preferred embodiment of the electronic circuits employed in the embodiment shown in FIG. 1.

Referring now to FIG. 3, there is shown a block diagram of the control means according to the present invention which includes hand, wrist and finger control means. For easier understanding, it will be noted that reference numerals having a "2" as a first digit indicates parts or portions of the hand control means, a "3" as the first digit indicates portions of the wrist control means, and a "4" as the first digit indicates parts belonging to the finger control means.

In the hand control means, there is provided a command device 201 having a memory device capable of reading out (Re) and writing (Wr) which develops a command signal as a reference by reading out in sequence. This command signal represents the intended position of the hand base 15. A subtracting device 202 subtracts the hand actuator position signal from the detector 250 from the command signal to yield a difference signal comprising an absolute signal component and sign signal component. The absolute signal component in digital form is converted by a digital-analog converter 203 to an analog signal which is then applied to an operational amplifier 204. The output signal of the amplifier 204 is applied through a changeover switch 205, which is responsive to the sign signal component from the device 202, to an operational amplifier 206.

The amplifier 206 has two input terminals and is arranged such that the polarity of its output signal is the same as that of one input signal thereto but is reversed with respect to the other input signal. The amplifier 206 is also arranged such that its maximum output signal is ±E volts. The switch 205 may be, for example, an electronic type and serves to connect the output signal from the amplifier 204 alternatively, in response to the sign signal component from the device 202, to one or the other of the input terminal of the amplifier 206. Thus, a hand error signal in analog form will be obtained at the output terminal of the amplifier 206.

This hand error signal is then applied to an operational amplifier 207 whose input and feedback resistors have a value of R. The output of the amplifier 207 is a manipulating signal which controls servo-valve 208 for operating the hand actuator 25. When the hand error signal is +E or —E volts, i.e. when the hand manipulating signal is —E or +E volts, respectively, the hand actuator 25 will rotate the shaft 24 in a positive or negative direction at S (for example, 90) °/sec.

As will be understood from the above description, the loop for controlling the hand base 15 is a closed loop, since the operation of the hand base 15 will not be adversely affected by the operation of the wrist 16 or the finger base 18, as is easily understood from the above TABLE.

In the wrist control means, those parts or portions identical or similar to those used in the hand control means are indicated by numerals whose latter two digits are identical to the corresponding digits of the hand control means.

There is further provided in the wrist control means a subtraction device 312 which subtracts the hand actuator position signal of the detector 250 from the wrist actuator position signal of the detector 390 to thereby develop a position signal for the wrist. This wrist position signal is applied to the subtracting device 302 as the negative input thereto. The manner of obtaining the wrist position signal is as follows. If the hand actuator 25 rotates in a positive or negative direction by a certain angle, then the wrist 16 will be bent in a negative or positive direction, respectively, by the same angle (see the Table) and the hand base 15, of course, will rotate through the same angle but in a positive or negative direction, respectively. Hence, the amount by which the wrist 16 is undesirably moved by the operation of the hand actuator 25 will be subtracted from the position signal of the wrist actuator 39 by subtraction device 312 to yield the actual wrist position signal as the output thereof.

Thus, thereby will be formed a comparing means to develop a wrist error signal so the output of an operational amplifier 306.

A summing operational amplifier 307 has a pair of input resistors both of a value 2R, and a feedback resistor of a value R. The amplifier 307 is supplied with the wrist error signal from the operational amplifier 306 and also with the hand error signal from the amplifier 206. Thus, the output of the amplifier 307 which is the wrist manipulating signal will be equal to the sum of the hand and wrist error signals divided by two. The wrist actuator 39 will rotate the shaft 38 at 2S (for example, 180) °/sec. in a positive or negative direction when the wrist manipulating signal is —E or +E volts.

The finger control means has a construction similar to that of the wrist control means, wherein the parts or portions identical or similar to those used in the wrist control means are indicated by reference numerals having the latter two digits identical to those of the wrist control means.

The finger control means further includes operational amplifier 407 which has three input resistors of a value 3R and a feedback resistor of a value R. The error signals from the operational amplifiers 206, 306 and 406 are applied to the amplifier 407. The finger actuator 49 rotates at 3S (for example, 270) °/sec. in a positive or negative direction when the finger manipulating signal, i.e. the output of amplifier 407, is $-E$ or $+E$ volts.

A typical operation of the aforedescribed preferred embodiment will now be explained with reference to FIGS. 4A and 4B.

Assume that the respective commands for the hands, the wrist and the fingers are all given as being in a positive direction, the command for the hand base 15 having a smaller value than the command for the wrist 16 which, in turn, has smaller value than the command for the finger base 18. Hence, the hand base 15, the wrist 16, or the finger base 18 each has the same rated speed of S (e.g., 90) °/sec., and the operation sequences in the following order: the hand 15, the wrist 16, and then the finger base 18.

Figure 4A:
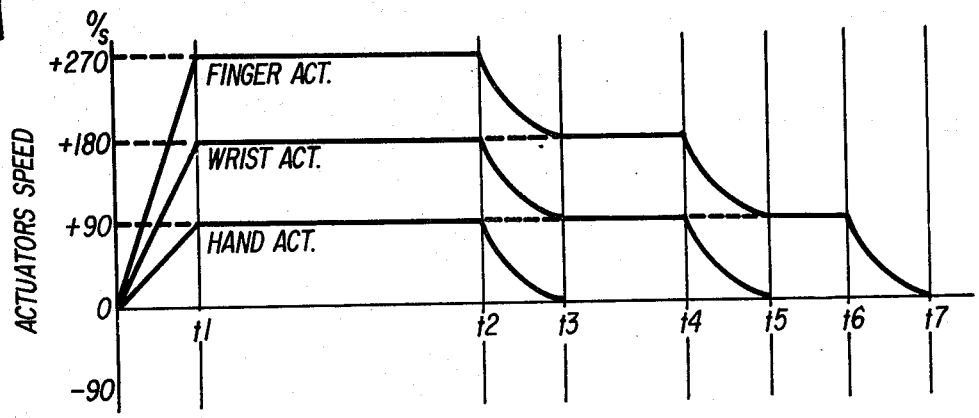
FIGS. 4A and 4B, and 5A and 5B are timing diagrams helpful in understanding the operation of the preferred embodiment shown in FIGS. 1, 2 and 3.

In FIG. 4A, after such a set of commands are given at a time $t=0$, the respective error signals for the hand 15, the wrist 16 and the finger base 18 will be of the same value $+E$ volts.

In the hand control means, since the gain of the amplifier 207 is unity, the servo-valve 208 is provided with a manipulating signal of $-E$ volts. This, in turn, means that at the time $t=t_1$ the hand actuator 25 will rotate in a positive direction at S (e.g. 90) °/sec. In the wrist control means, the operational amplifier 307 is provided at its two inputs, respectively, the hand error signal of $+E$ volts and the wrist error signal of $+E$ volts, hence the wrist manipulating signal becomes $$-\left(\frac{E}{2} + \frac{E}{2}\right) = -E \text{ volts.}$$

This means that at the time $t=t_1$ the wrist actuator 39 will be operated to rotate in a positive direction at 2S (e.g., 180) °/sec. In the finger control means, the amplifier 407 receives as its three inputs, respectively, the hand error signal of $+E$ volts, the wrist error signal of $+E$ volts and the finger error signal of $+E$ volts, hence the finger manipulating signal will be $$-\left(\frac{E}{3} + \frac{E}{3} + \frac{E}{3}\right) = -E \text{ volts.}$$

Thus at the time $t=t_1$ the finger actuator 49 will be rotated in a positive direction at 3S (e.g., 270) °/sec., all of which is clear from FIG. 4A which shows the hand, wrist and finger actuators' speed as a function of time.

Figure 4B:
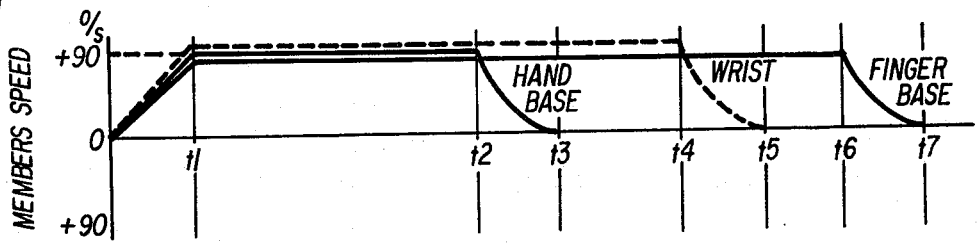

Then, as seen in FIG. 4B which shows the speed of the hand base, wrist, and finger base on the same time scale as in FIG. 4A, the hand base 15 is rotated in a positive direction at S (e.g., 90) °/sec.. The wrist is rotated in a positive direction at S (e.g., 90) °/sec., as a result of the summation of the proper movement at 2S °/sec. in the positive direction and the undesirable movement at S °/sec. in the negative direction (ef. Table). The finger base 18 is rotated in a positive direction at S °/sec., as a result of the summation of the proper movement at 3S °/sec. in the positive direction and the undesirable movement at 2S °/sec. in the negative direction.

Thereafter, the hand actuator 25 begins to reduce its rotational speed at the time $t=t_2$ (FIG. 4A) and stops its operation at $t=t_3$. That is, the hand error signal becomes zero at $t=t_3$. Then the output of the amplifier 307 becomes $$-\frac{E}{2} \text{ volts}$$

and the rotational speed of the wrist actuator 39 changes from 2S to S °/sec. But the subsequent movement and speed of the wrist 16 will not change since there is undesirable movement due to the operation of the hand actuator 25. Smooth operation can thereby be performed. Similarly, the output of the amplifier 407 becomes $$-\left(\frac{E}{3} + \frac{E}{3}\right) = -\frac{2}{3}E \text{ volts,}$$

and the finger actuator 49 will rotate at 2S (180) °/sec. However, the finger base 18 maintains its rotation speed substantially at S (e.g., 90) °/sec. Accordingly, smooth and continuous operation thereof can also be obtained.

Further, the wrist 16 will begin to reduce its speed at the time $t=t_4$ and will stop at $t=t_5$. The output signal of the amplifier 407 then becomes $$-\frac{E}{3} \text{ volts}$$

and in turn, the finger actuator 49 and the finger base 18 will rotate at S °/sec. as shown in FIG. 4A and 4B.

Finally, the finger error will become small, and the finger base 18 will begin to reduce its speed at the time $t=t_6$ and will stop at the time $t=t_7$.

Figure 5A:
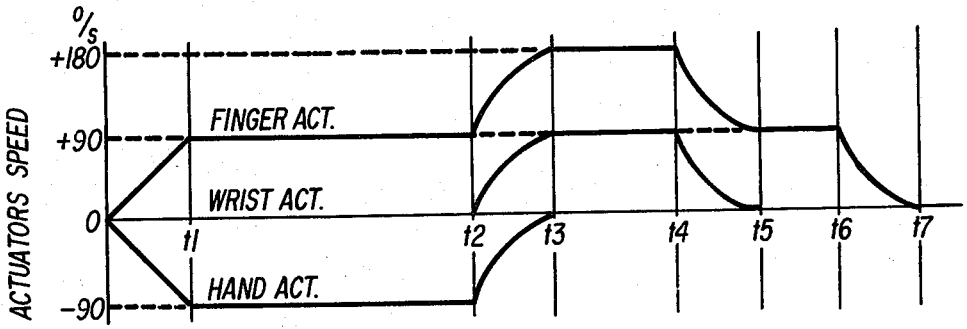
Figure 5B:
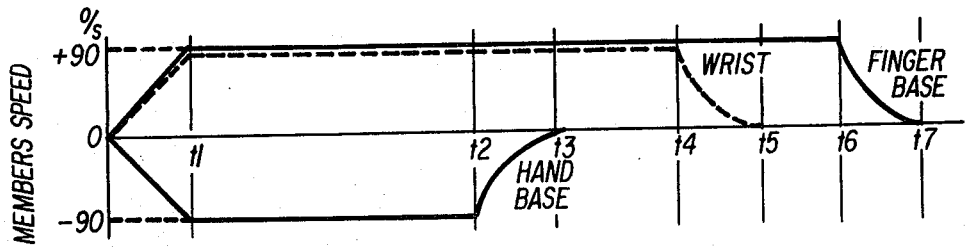

Referring now to FIGS. 5A and 5B another typical operation of the device of the present invention will be explained.

In this case at the time $t=0$ are given the command signal for hand base 15 having a negative direction and the command signals for the wrist 16 and the finger base 18 each having a positive direction. The relationships between the magnitudes of three command signals are similar to those in the case described above with respect to FIG. 4A.

At the time $t\approx 0$, the hand error signal from the amplifier 206 becomes $-E$ volts, the wrist error signal from the amplifier 306 becomes $+E$ volts and the finger error signal from the amplifier 406 becomes $+E$ volts. Thus, the hand manipulating signal becomes $+E$ volts and the hand actuator 25 will be rotated in a negative direction at S (e.g., 90), °/sec. at $t=t_1$ and in turn, the hand base will be rotated in a negative direction at S(e.g., 90) °/sec. since the wrist actuator 39 will not be rotated.

At the time $t=t_2$ the hand base 15 begins to reduce its speed, eventually halting at time $t=t_3$. This means that the hand error signal from the amplifier 206 becomes zero at t=t₃. Then the wrist manipulating signal from the amplifier 307 becomes $$-\left(0+\frac{E}{2}\right)=-\frac{E}{2} \text{ volts}$$

whereupon the wrist actuator 39 will begin to rotate in a positive direction up to S (e.g., 90) °/sec. In turn, the wirst 16 will maintain its speed of substantially S °/sec. The finger manipulating signal then becomes $$-\left(0+\frac{E}{3}+\frac{E}{3}\right)=-\frac{2}{3}E \text{ volts}$$

whereupon the finger actuator 49 will increase its speed up to 2S °/sec. while the finger base 18 maintains its speed at substantially S °/sec. Hence, a continuous and smooth operation, as shown in FIG. 5B, can be obtained.

As described hereinabove, the operational amplifier 307 receives not only the wrist error signal from the amplifier 306 but also the hand error signal from the amplifier 206. When only the hand actuator 25 is operated in a positive or negative direction at a speed of S °/sec., the wrist actuator 39 will be operated in a positive or negative direction at S °/sec. Thus, the actuators 25 and 39 are rotated substantially simultaneously, whereupon any undesirable motion of the wrist 16 due to the operation of the actuator 25 will be substantially cancelled. This means that a wrist error signal may not appear whereby the undesirable movement of the wrist 16 can be substantially eliminated but if a small wrist error signal appears the wrist actuator 39 will be operated in response to the wrist error to reduce such wrist error signal.

If both of the command signals for the hand base 15 and the wrist 16 are generated in a positive or negative direction, the amplifier 307 will receive a hand error signal of +E or −E volts and a wrist error signal of +E or −E volts. Then the wrist actuator 39 will be operated at a speed of 2S °/sec. Accordingly, it is seen that the wrist actuator 39 can be controlled in response to the command signal for the wrist substantially independently of the operation utilized for cancelling the undesirable movement thereof due to the operation of the hand actuator 25.

The corresponding operation of the finger control means is obviously similar to the foregoing, so that a further explanation thereof is not needed.

According to the present invention, therefore, the undesirable movement of the movable members can be amply compensated for and the operation of the compensation system is substantially independent of the main control of the device in response to the command signals. Thus, smooth and continuous movement of the movable members may be obtained by the device of the present invention which advantageously has a relatively simple construction.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. An industrial robot having a plurality of moving members;
   a plurality of independent actuator means;
   mechanical means forming a force imparting linkage which is primarily intended for driving each member by an associated independent actuator means and is actually interrelated such that operation of at least one of the independent actuator means brings about the intended movement of the moving member associated therewith and an undesirable movement of one of the other moving members;
   control means for controlling the movement of moving members in response to a plurality of command signals respectively;
   wherein said control means comprises:
   a plurality of error signal generating means each generating an error signal indicative of the difference between the actual position and desired position represented by said command signal of its associated moving member;
   a plurality of manipulating signal generating means each generating a manipulating signal in response to its associated error signal at the least for controlling its associated independent actuator;
   means for supplying the error signal of the moving member, operation of whose associated independent actuator means causes the undesirable movement of one of the other moving members, to the manipulating signal generating means associated with the moving member subjected to the last mentioned undesirable movement in the sense to cancel the undesirable movement thereof.

2. The industrial robot according to claim 1, wherein each of said error signal generating means, further comprises:
   position detecting means responsive to the actual position of its associated independent actuator means for generating a position signal proportional to said actual position, and first comparing means capable of producing the error signal indicative of the difference between the actual position and desired position of its associated moving member.

3. The inductrial robot according to claim 2, wherein said error signal generating means associated with moving member which is subjected to said undesirable movement, further includes:
   second comparing means for generating an associated moving member's actual position signal which is representative of the difference between the position signal from its associated position detecting means and the position signal from the position detecting means associated with said actuator means which causes said undesirable movement,
   said associated moving member's actual position signal and associated command signal being supplied to said first comparing means.

4. The industrial robot according to claim 3 wherein said error signal generating means includes means responsive to the direction of movement of its associated moving member and of the moving member which causes said undesirable movement to change the sign of said error signal accordingly.

5. The industrial robot according to claim 3 wherein said plurality of moving members include first, second and third moving members and wherein said manipulating signal generating means of said second member is responsive to both its associated error signal and the error signal associated with said first moving member and wherein said manipulating signal generating means of said third member is responsive to its associated error signal and to the error signals associated with said first and second moving members.

6. The industrial robot according to claim 5 wherein said manipulating signal generating means of said first moving member is responsive only to its associated error signal.

7. The industrial robot according to claim 6 wherein said manipulating signal generating means of said first moving member comprises a first operational amplifier having an input resistance equal to its feedback resistance.

8. The industrial robot according to claim 7 wherein said manipulating signal generating means of said second member comprises a second operational amplifier having two inputs of equal resistance, one of which is connected to its associated error signal generating means, the other of which is connected to said error signal generating means of said first moving member.

9. The industrial robot according to claim 8 wherein said manipulating signal generating means of said third moving member comprises a third operational amplifier having three inputs of equal resistance, one of which is connected to its associated error signal generating means, another of which is connected to said error signal generating means of said second moving member, the third of which is connected to said error signal generating means of said first moving member.

10. The industrial robot according to claim 9, wherein the feedback resistances of all of said operational amplifiers are of equal magnitude, and wherein the input resistances of said second amplifier are each twice the value of said feedback resistance, and wherein the input resistances of said third operational amplifier are each three times the value of said feedback resistance.

* * * * *